Nov. 10, 1959 F. P. ADLER ET AL 2,911,925
MOVABLE BULKHEAD
Filed Jan. 12, 1953 5 Sheets-Sheet 2

Inventors
Franklin P. Adler
James J. Hunt
Wilbur V. McGuire
& Archie M. Miers
By Wayne Morris Russell
Attorney

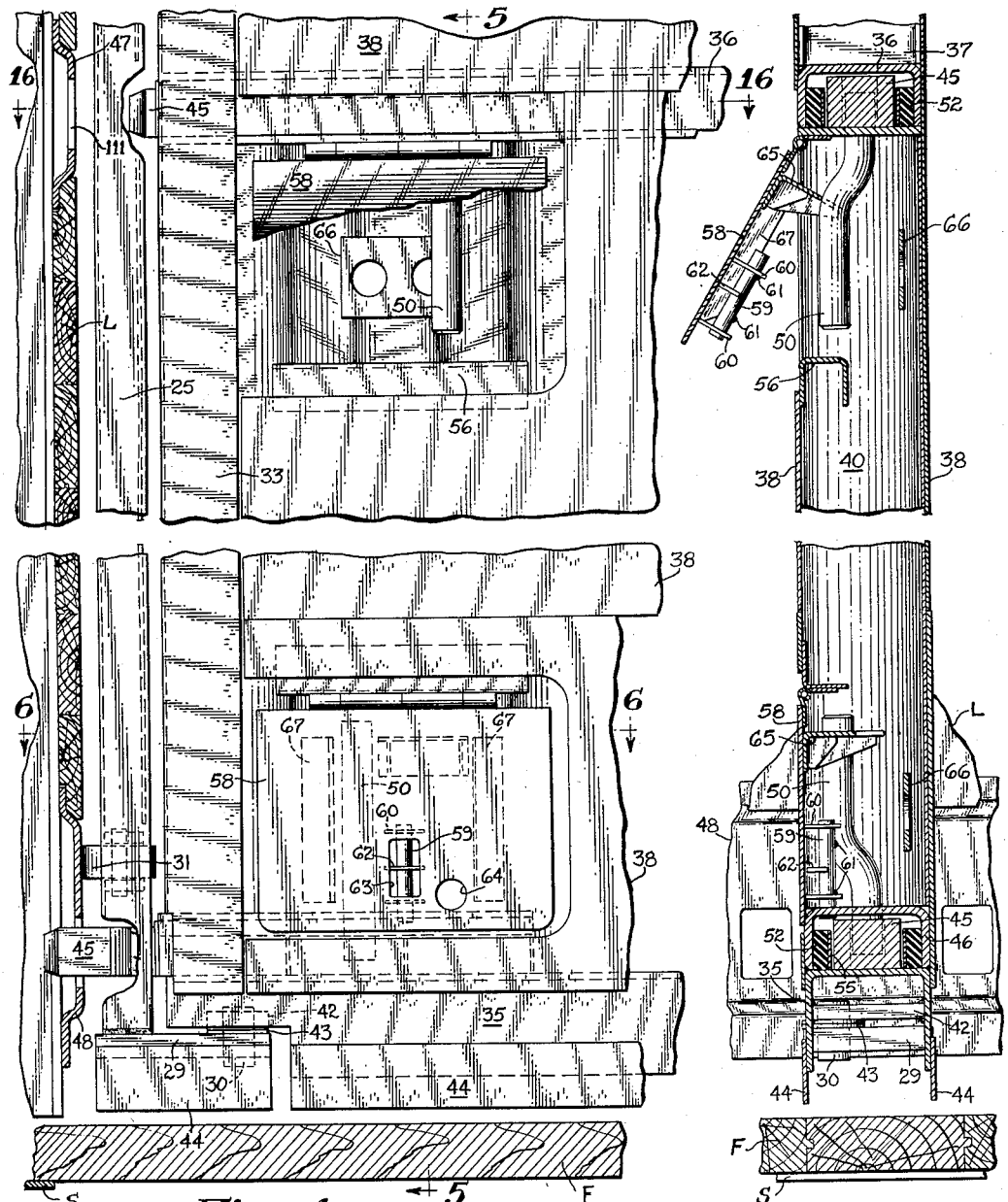
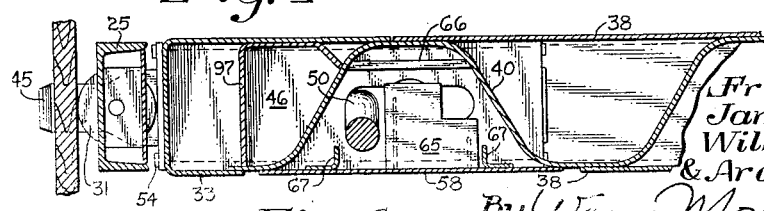
Fig. 4  Fig. 5  Fig. 6
Inventors
Franklin P. Adler
James J. Hunt
Wilbur V. McGuire
& Archie M. Miers
By Wayne Morris Russell
Attorney Inventors
Franklin P. Adler
James J. Hunt
Wilbur V. McGuire
& Archie M. Miers
By Wayne Morris Russell
Attorney Nov. 10, 1959 F. P. ADLER ET AL 2,911,925
MOVABLE BULKHEAD
Filed Jan. 12, 1953 5 Sheets-Sheet 5
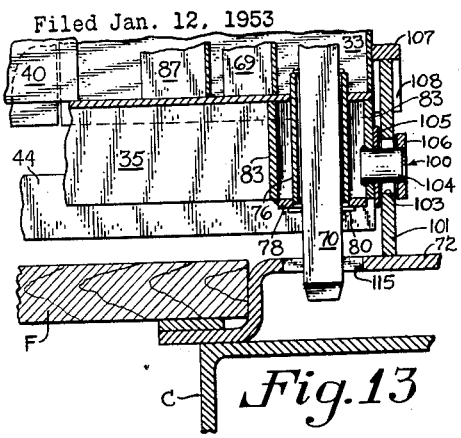
Fig.13
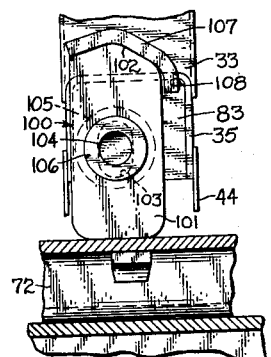
Fig.14
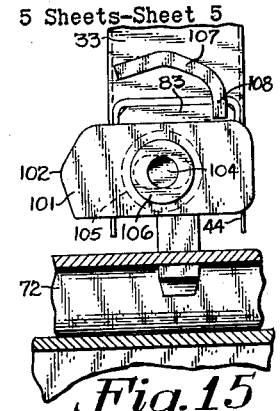
Fig.15
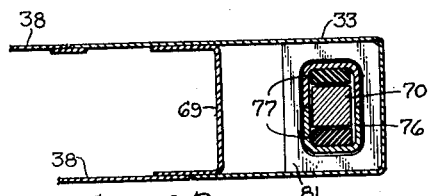
Fig.12
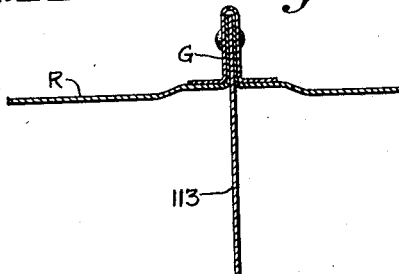
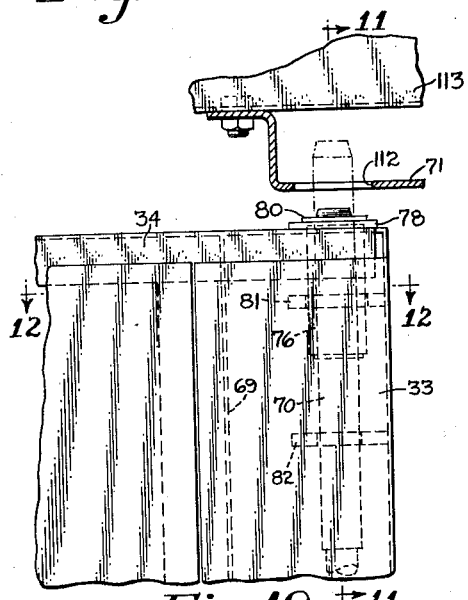
Fig.10
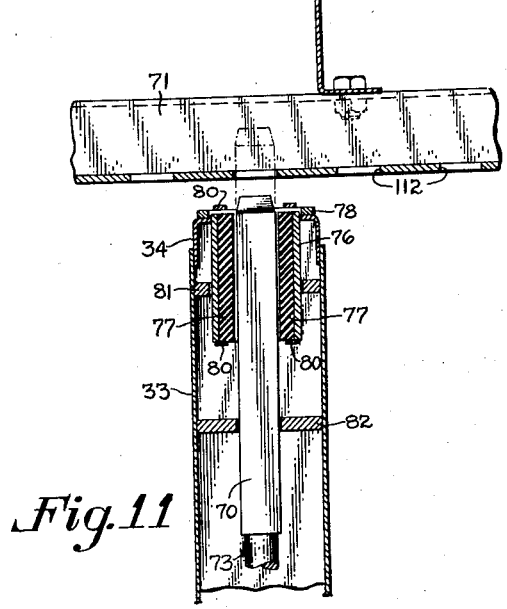
Fig.11
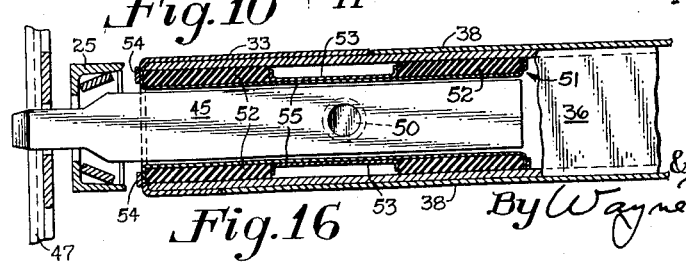
Fig.16
Inventors
Franklin P. Adler
James J. Hunt
Wilber V. McGuire
& Archie M. Miers
By Wayne Morris Russell
Attorney United States Patent Office 2,911,925
Patented Nov. 10, 1959

2,911,925

MOVABLE BULKHEAD

Franklin P. Adler, Michigan City, Ind., and James J. Hunt, Harvey, and Archie M. Miers, Homewood, Ill., and Wilbur V. McGuire, Albuquerque, N. Mex., assignors to Pullman Incorporated, a corporation of Delaware Application January 12, 1953, Serial No. 330,694

7 Claims. (Cl. 105—376)

The present invention relates to a movable bulkhead of the type employed in railway cars and other vehicles to restrain lading from shifting, and more particularly to such a bulkhead which provides great strength without excessive weight and has novel and improved operational characteristics.

In the disclosed embodiment of the invention, shown as employed in a railway box car, a vertically corrugated plate extending over the major portion of the height of the bulkhead is secured between the opposite bulkhead faces to provide beams which resist lading impact stresses but permit the bulkhead to flex sufficiently to avoid permanent deformation by excessive stresses. Slidably mounted in the bulkhead are locking bars projectible outwardly of its edges to engage in keeper means to hold the bulkhead at a selected position, these bars being mounted between cushioning pads which act as shock absorbers for the bulkhead and bars. The bars have operating handles for projection and retraction thereof disposed in the bulkhead accessible through openings having hinged covers. By suitable means, the locking bars are held in locked position against accidental unlocking, and the covers when the bars are unlocked are held in open position to signal the unlocked condition of the bars. The bulkhead is pivoted at one end on a vertical post depending from a carriage traveling on an overhead track so that it may be swung against the side of the car during loading or unloading and shifted to appropriate position longitudinally of the car and swung transversely thereof when it is to retain lading in position. To lessen the load on the pivoted connection or support, an auxiliary support is provided at the free bulkhead end in the form of a member pivoted on the bulkhead so that it may extend below the lower edge thereof and engage between the car floor and an abutment on the bulkhead with that end of the bulkhead raised slightly above its unsupported position.

It will be apparent that a bulkhead of this construction has many advantages over adjustable bulkheads heretofore employed. The mounting of the locking bars and operating handles within the bulkhead allows substantially flush faces on both sides so that there are no parts projecting into the lading space. The vertically corrugated plate provides vertical beams to resist lading impacts on the bulkhead, but affords sufficiently resilient connections between the beams to pedmit flexing so as to avoid permanent deformation if for any reason sufficient stress is imposed to overcome the beam resistance. The cushioning of the locking bars minimizes shocks on the structure by slowing the transmission of stresses from the bulkhead through its frame and the locking bars to the car parts and thus lowering the stress peak. The covers and their associated parts provide for positive retention of the locking bars in projected position, and also indicate when the bars are not locked, since they are held in open position when the bars are retracted. This assures that the bulkhead will be locked in lading-retaining position and not left in ineffective partially or completely unlocked position. The auxiliary support relieves strain on the pivotal support of the bulkhead to lengthen the trouble-free life of the structure and permit lighter construction.

It is an object of the invention to provide a movable bulkhead having ample strength and rigidity to withstand lading impacts and resilience to yield under excessive impact stresses so as to avoid permanent deformation.

It is another object to provide a movable bulkhead having a shock-absorbing locking construction and telltale means to indicate locked and unlocked condition thereof.

Another object is the provision of a movable hingedly mounted bulkhead with a support auxiliary to its hinged support for relieving strain on the latter.

Another object is the provision of a movable bulkhead incorporating a vertically corrugated plate as a diaphragm providing vertical beams to resist lading impact stresses while allowing resilient yielding under excessive impacts to avoid permanent deformation and thus affording a relatively light but very strong constrution.

A further object is the provision of a movable bulkhead having locking means engageable with fixed parts of a vehicle for securement in selected positions and provided with means automatically indicating locked or unlocked condition thereof to prevent inadvertent omission of securement.

Still another object is the provision of a movable bulkhead having locking means for securement in a selected position provided with means automatically preventing accidental movement of the locking means from locked position.

Another object is the provision of a movable bulkhead securable in a selected position by locking means having cushioning means to minimize dynamic load on the bulkhead.

Another object is the provision of a movable bulkhead hingedly supported at one end for horizontal swinging movement and having an auxiliary support pivoted at its other end operable to relieve the hinged support of a portion of the bulkhead weight and prevent excessive vertical vibration.

Other and further objects, advantages, and features of the invention will be apparent to those skiled in the art from the folowing description in conjunction with the accompanying drawings, in which:

Fig. 4 is a broken enlarged front elevation of the bulkhead showing the side locking bars and operating mechanism;

Fig. 5 is a vertical section taken on the line 5—5 of Fig. 4;

Fig. 6 is a horizontal section taken on the line 6—6 of Fig. 4;

Fig. 10 is an enlarged fragmentary elevational view showing the relation of the top locking bar to the ceiling keeper;

Fig. 11 is a vertical sectional view taken along the line 11—11 of Fig. 10, but including a portion of the car roof to illustrate the ceiling keeper arrangement more clearly;

Fig. 12 is a horizontal sectional view taken along the line 12—12 of Fig. 10;

Fig. 13 is a fragmentary vertical sectional view taken along the line 13—13 of Fig. 8;

Fig. 14 is an end elevational view of the parts shown in Fig. 13;

Fig. 15 is a view similar to Fig. 14, but showing the auxiliary support in idle or non-supporting position; and Fig. 16 is a horizontal sectional view taken along the line 16—16 of Fig. 4.

Figure 1:
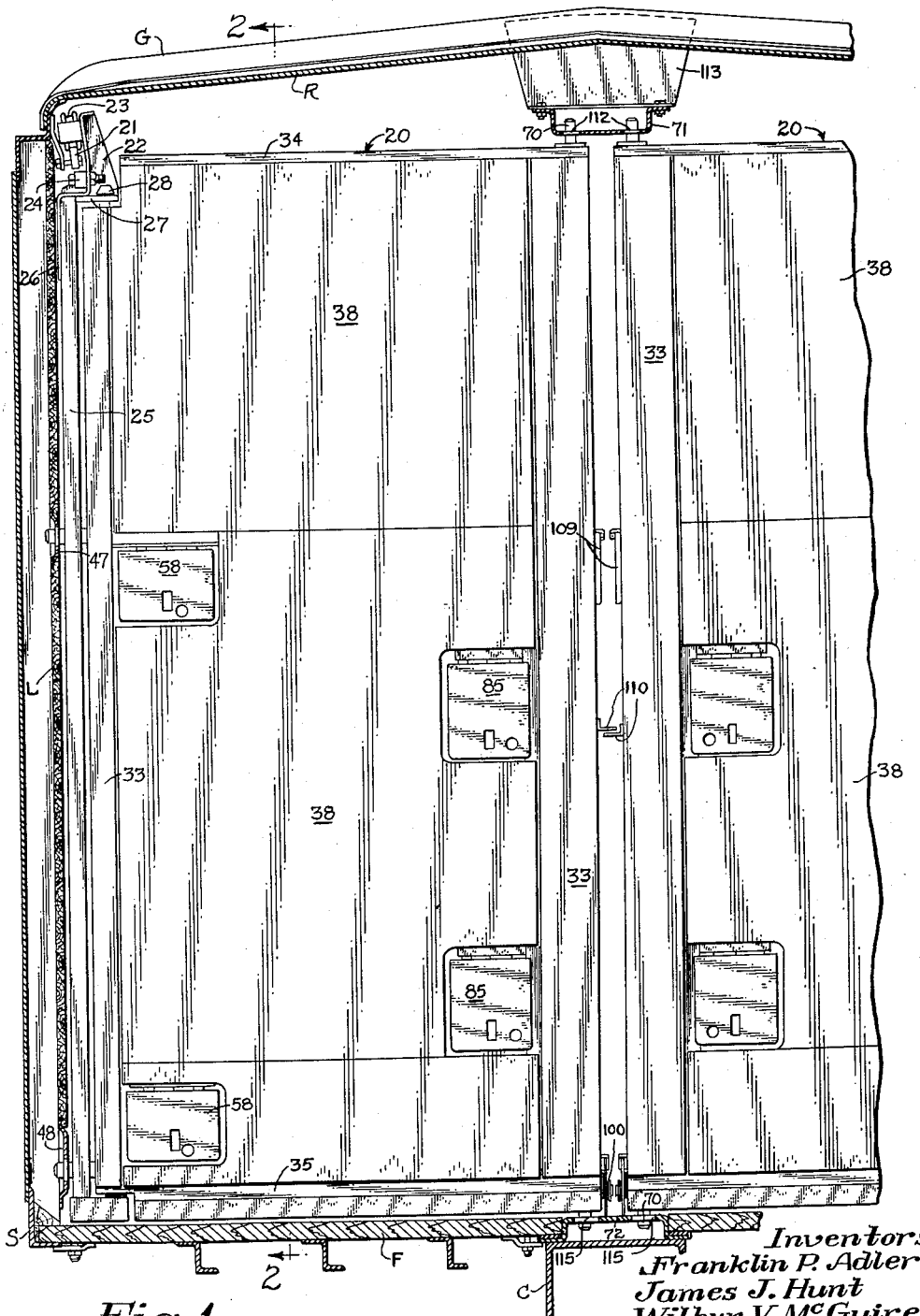
Fig. 1 is a front elevational view of one bulkhead and a portion of another in lading-retaining position in a railway box car.
Figure 2:
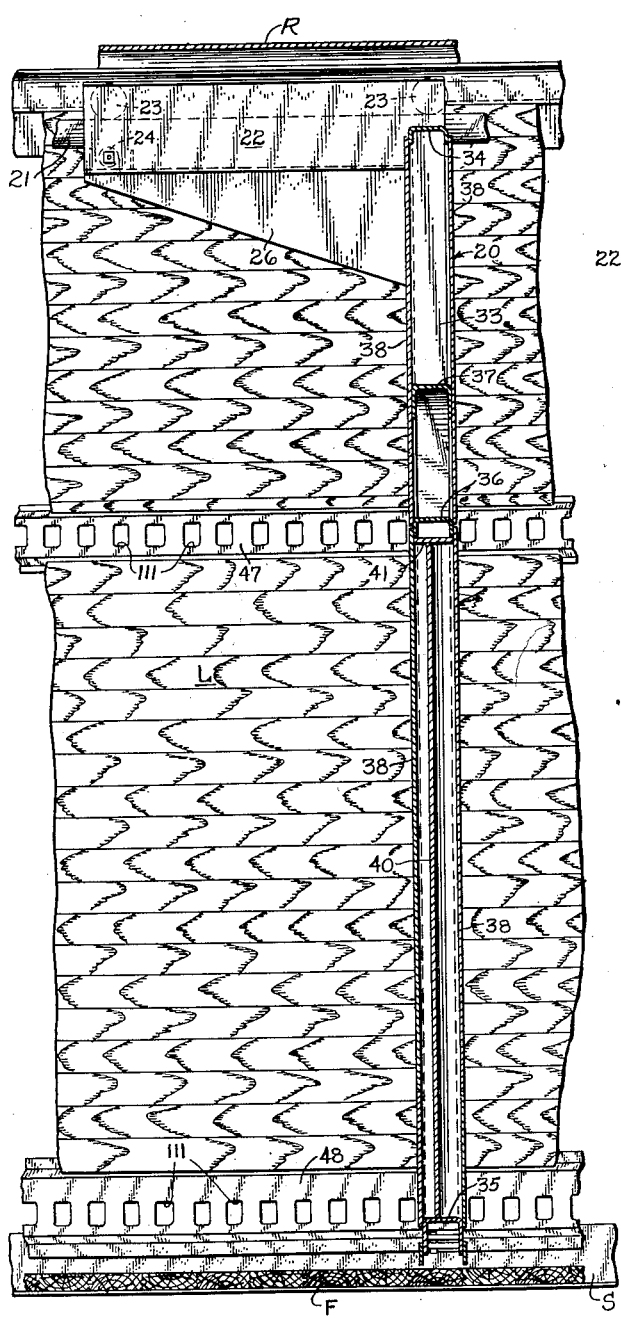
Fig. 2 is a vertical sectional view taken along the line 2—2 of Fig. 1.

Referring to the drawings, and particularly to Figs. 1 and 2, the invention is illustrated as embodied in a bulkhead 20 mounted in a box car having a side wall with an inner lining L, a floor F supported on side sills S and center sill C, and a roof R formed of panels having upturned meeting edges covered by carline caps G. As will be evident from Fig. 1, the bulkheads are preferably employed in pairs, each extending substantially half way across the car, and a pair of bulkheads is ordinarily provided for each end of the car. Each bulkhead 20 is mounted for movement longitudinally of the car on a track 21 in the form of a bar supported from the side plate slightly below the roof by suitable brackets. An elongated carriage 22 with upper rollers 23 at its ends engaging on the upper surface of the track and lower rollers or spools 24 normally spaced slightly below the track surface is provided to carry the bulkhead. By this arrangement, movement of the carriage due to a buffing impact or other jolt to the car is snubbed by one or the other spool 24 coming into engagement with the lower edge of the track as the carriage tends to swing up or down on the forward or rear roller 23 as a result of such an impact. At the end of the carriage is secured a vertical pivot or hinge post 25 depending substantially to the floor F. Its connection to the carriage is rigidified by a triangular brace plate 26. At its upper end the post 25 has a horizontally projecting plate 27 to pivot the upper end of the bulkhead by means of a suitably secured vertical pin 28, and at its lower end has welded thereto a similar plate 29 (Fig. 4) carrying a pivot stud 30 projecting upwardly for pivotal engagement of the lower end of the bulkhead. The post 25 is preferably of hollow box section formed by a rolled channel member with a plate welded between its flanges, as best shown in Figs. 4 and 6. Near its lower end the post has a horizontal roller 31 suitably journaled therein and projecting outwardly to bear against the lining L and thus maintain the post vertical and spaced from the side wall.

The bulkhead 20 comprises a generally rectangular frame provided by vertical side members 33, defining the outer or hinged end and the inner or free end of the bulkhead, a top member 34, and a bottom member 35 (Figs. 4, 5, 6, 9, and 12) and having an intermediate horizontal member 36 and a diagonal bracing member 37 extending from the outer end of member 36 to the free edge of the bulkhead at the upper corner (Fig. 2). The frame members are of generally channel section as shown in the drawings. Metallic sheets 38, which might be foraminous, are secured to the frame to provide spaced facings for the opposite sides of the bulkhead, and in the space between the bulkhead faces, extending between the side members 33 and from the bottom member 35 to the intermediate member is a corrugated plate 40, disposed with its corrugations extending vertically and secured to the frame and to the sheets 38. The plate 40 extends over the major portion of the height of the bulkhead, as shown, and a horizontal plate 41 is welded over its upper edge and to the flanges of the member 36, forming a box section therewith. At the outer end of the bottom member 35, above the pivot-carrying plate 29 of the post 25, there is secured a pivot plate 42 suitably apertured to engage on the pivot stud 30, which is of sufficient height to allow shim washers 43 to be disposed thereon between the plates 29 and 42 to adjust the clearance of the bulkhead above the floor and allow for variations between different cars. It is to be noted that the upper outer corner of the bulkhead is recessed so that the bulkhead may extend above the upper plate 27 of the post 25, and the flanges of the bottom frame member 35 are similarly cut away, as shown in Fig. 4, to accommodate the plate 29. From Fig. 5 it will be seen that the pivot stud 30 is disposed closer to what for convenience may be called the front or forward face of the bulkhead than to the other or rear face, and the upper pivot pin 28 is similarly located. This arrangement is employed to allow the bulkhead to swing forwardly from its position transverse of the car, that is toward the center of the car, but not beyond the transverse position in the opposite direction, toward the end of the car, since the rear face of the bulkhead is intended to engage lading disposed at the end of the car. On the downwardly extending flanges of the bottom member 35 are welded skirt strips 44, and such strips are similarly welded to the edges of plate 29, to depend into fairly close clearance relation with the floor F. The skirt strips are applied after the bulkhead has been mounted in the car, so that variations of particular cars from nominal dimensions will not interfere with proper fit of the bulkhead.

A horizontally working locking bar 45 is slidably mounted within the intermediate frame member 36 adjacent the outer edge of the bulkhead, and another such bar 45 is similarly mounted on the web of the bottom member 35, within an inverted channel member 46 the flanges of which are welded to the member 35. The bars 45 project outwardly through the adjacent side member 33 and into the post 25, and are projectible through suitable apertures in the post to engage with upper and lower side keeper members 47 and 48 which are fully described herebelow. Each bar 45 is of rectangular cross section with a reduced outer end and a handle 50 fixed thereto at an inner portion by which it may be projected and retracted, and is mounted to have a certain amount of lateral movement relative to the bulkhead. Between each flange of the member 36 and channel member 46 and the adjacent side of the bar 45 received therein is disposed a shock-absorbing or cushioning element 51, best illustrated in Fig. 16. Each element 51 includes a pair of spaced resilient pads 52 held in place along the length of the bar by a flanged spacer plate 53 disposed between them and vertical retainer strips 54 welded to the member 36 or channel 46, as the case may be, at the opposite ends of the element 51. A wear plate 55 extends between the pads and the adjacent side of bar 45 and has end flanges received within the end retainer strips 54. The strips 54 and the flanges 53 and 55 are of less width than the thickness of pads 52 so that the latter may be compressed between the bar 45 and the bulkhead 20.

The handle 50 of the upper locking bar 45 extends downwardly through a slot in the plate 41 into rearward corrugation of the plate 40, as best shown in Figs. 4 and 5, and is offset so that a grasping portion is disposed close to the forward face of the bulkhead. The handle of the lower bar 45 is similarly arranged, as best seen in Figs. 5 and 6, except that it projects upwardly through a suitable slot in the web of the channel member 46. Access to the handle is provided by suitable openings formed in the forward face of the bulkhead, the bottom edge of the opening for the upper handle being reinforced by an inverted channel member 56 welded by one flange to the interior of a face sheet 38 so as to extend above the edge. The bottom edge of the opening for the lower handle is located somewhat below the top of the channel member 46. Each of the openings is provided with a closure or cover 58 hinged to swing forwardly and upwardly from closed position in the plane of the front face of the bulkhead when it is desired to operate the locking bars 45. As evident from the drawings, it is not necessary that the covers close the openings completely. Each cover 58 has a latch on its inner face engageable with a suitable aperture in the associated channel member 46 or 56 to lock the cover in closed position. The latch comprises a bolt 59 mounted for vertical sliding movement in guides 60 welded to the cover, weld beads 61 being provided on the bolt to engage with the guides for limiting its movement in both directions. A finger catch 62 is welded to the bolt extending toward the cover, and an aperture 63 is formed in the cover through which a finger may be inserted to engage the catch for raising the bolt and thus unlocking the cover. Another aperture 64 is provided in the cover for receiving a finger to swing the cover open after it has been unlatched. In Fig. 5, the open upper cover 58 is shown with the latch in raised or unlocking position to illustrate the upper limit of movement of the bolt 59, and the lower cover is shown closed with the latch engaged, the bolt being in its lowest position.

The covers 58 are employed as telltales or visual signals to indicate locked or unlocked condition of the locking bars 45, and also to hold the bars positively against accidental retraction from locked position, by means of rearwardly projecting members on their inner faces. These projecting members are provided for each cover by an angle plate which may be suitably braced and has a vertical flange welded to the cover and a horizontal plate portion 65 extending rearwardly beyond the plane of the handle 50. The plate is so located that in the projected or locked position of the bar 45, with the cover closed, it extends alongside the handle in its bar-projecting position and blocks the path of the handle to its retracting position, so that the handle and therefore the locking bar cannot be moved accidentally, as by shocks or vibration, to retracted or unlocking position. The latch prevents the cover from swinging open, so that the projecting plate portion 65 is maintained in its positive handle-blocking position. When it is desired to retract the locking bar 45, the cover latch is released and the cover opened, swinging the plate portion 65 clear of the handle 50, which may then be moved to slide the bar inwardly out of the bulkhead out of engagement with the associated keeper member. With the bar and handle in retracted position, the rear edge of the plate portion 65 engages against the handle to hold the cover against swinging to closed position so that it extends out of the plane of the bulkhead and thus gives visible indication that the locking bar is retracted, as shown in the upper portion of Fig. 5. The edge of the plate portion 65 may be offset or cut away as illustrated in Fig. 6 so that the plate extends across the path of the handle to prevent its shifting to projected position unless the cover is first swung outwardly to move the plate clear of the handle. In this manner, the cover signals unlocked condition of the locking bar so that the bulkhead will not be left wholly or partially unsecured in its lading-retaining position. The cover also positively locks the locking bar in projected position so that it cannot come unlocked in transit to render the bulkhead partially ineffective for restraining lading disposed between it and the car end. To guard against the possibility of the locking bars 45 sticking or binding for any reason so that they will not slide readily, a fulcrum plate 66 is welded across the corrugation in which the handle 50 is disposed, behind the handle, and is formed with a pair of apertures into which the end of a suitable lever may be inserted through the opening in the forward face of the bulkhead for applying sufficient force to the handle in one or the other direction to shift the locking bar. Each cover 58 may be strengthened by a pair of vertically disposed angle pieces 67 welded to its inner face.

At the inner or free end of the bulkhead, within the flanges of the vertical side member 33, there is welded a channel member 69 reinforcing the edge of the bulkhead and defining a hollow box section with the member 33. In the hollow space thus provided, vertically operating top and bottom locking bars 70 are slidably mounted for projection into and retraction from engagement with top keeper member 71 and floor keeper member 72, respectively. The keeper members are described hereinafter. Each locking bar 70 is of substantially square cross section and is adapted to be projected and retracted through a suitable aperture in the top frame member 34 or bottom frame member 35, as the case may be. The top locking bar has an extension 73 depending therefrom to a point below the level of the intermediate frame member 36, and a handle 74 extends horizontally from the lower end of this extension into the interior of the bulkhead. The bottom locking bar extends upwardly a suitable distance above the bottom frame member 35 and has a handle 75 at its upper end projecting interiorly of the bulkhead. At the inner end of the bulkhead, the corrugated plate 40 terminates short of the side frame member 33 and defines a vertically extending space with the channel member 69, between the faces of the bulkhead, and the handles 74 and 75 extend into this space. The locking bars 70 are provided with cushioning means for the same purpose and in much the same manner as the side locking bars 45. Specifically, as best shown in Figs. 10 to 12, a tubular member 76, which may be formed by two channel pieces, is welded to the edges of the aperture in the top frame member 34 to depend about the top bar 70 and has a pair of resilient pads 77 therein, one on each side of the locking bar and spaced transversely of the bulkhead thereby. The edges of the aperture are reinforced by an apertured plate 78 surrounding the upper end of the tubular member 76, and retaining strips 80 are welded across the ends of the member 76 in spaced relation to the locking bar to hold the pads 77 in place. An apertured brace plate 81 is welded within the side member 33 below the top member 34, and the tubular member extends through this plate to be held against lateral movement, though it need not be welded or otherwise positively secured to the plate. The tubular member 76 with the pads 77 serves as an upper guide for the locking bar 70, and lower guides 82 are provided in the form of apertured plates welded within the side member 33 below the member 76. The cushioning of the bottom locking bar 70 is effected in substantially the same manner as the top bar, but because the bottom member 35 is reversed relative to the bottom locking bar as compared to the relation of the top member 34 and top bar, the web of the member 35 is employed to brace the upper end of the tubular member, and a pair of transverse plates 83 are welded between its flanges substantially in continuation of the webs of the channel member 69 and side member 33, and the reinforcing plate 78 is welded to the bottom edges of the flanges and plates as well as to the lower end of the tubular member, all as shown in Fig. 13. The pads and retaining strips are arranged as in the case of the top bar 70. A guide 82 is provided for the bottom bar 70 at its upper portion.

Figure 7:
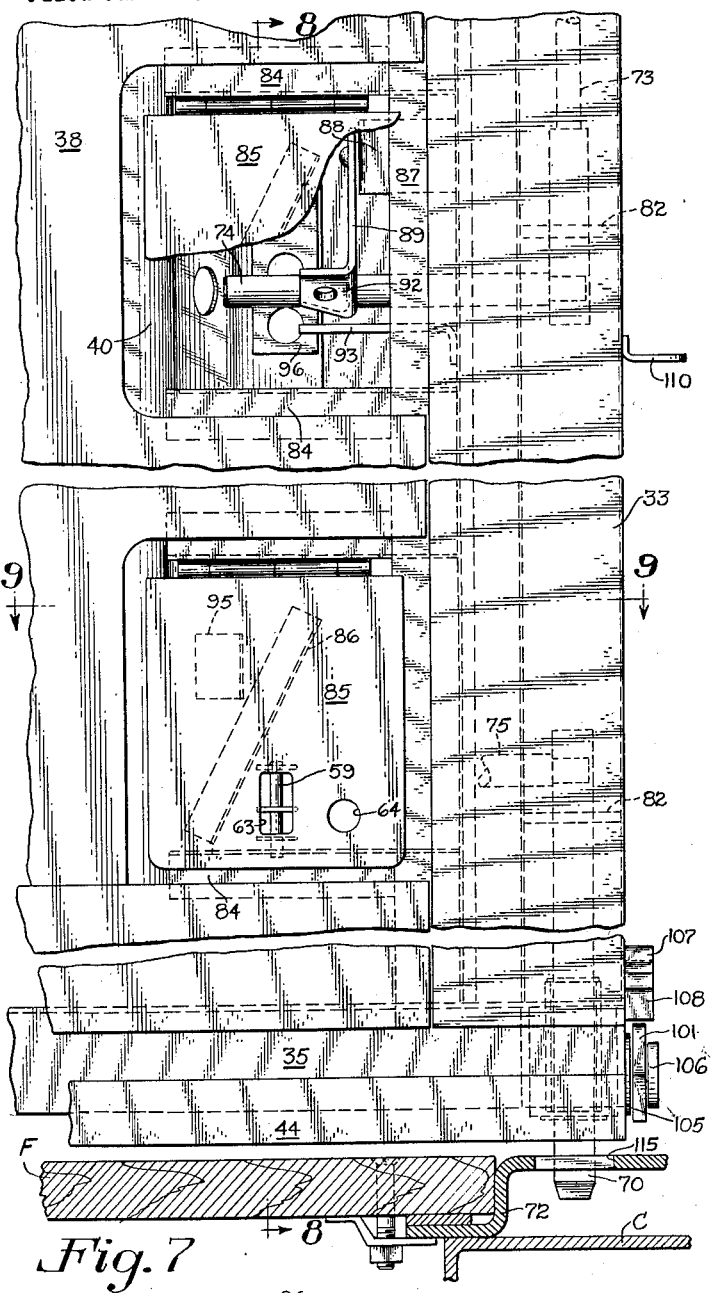
Fig. 7 is a broken enlarged front elevation of the bulkhead showing the top and bottom locking bars and operating mechanism.
Figure 8:
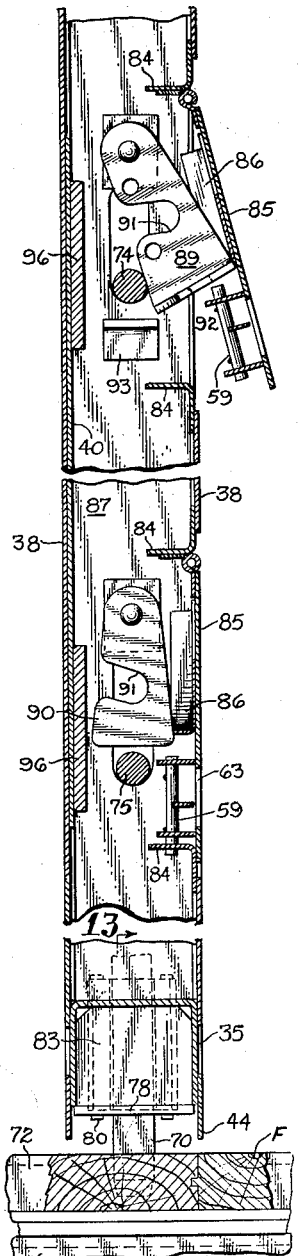
Fig. 8 is a vertical section taken along line 8—8 of Fig. 7.
Figure 9:
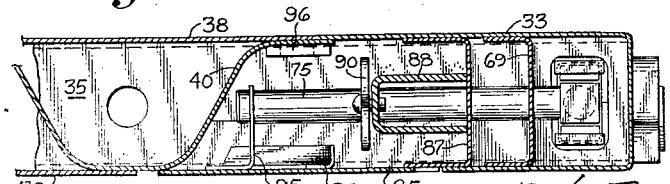
Fig. 9 is a horizontal section taken along the line 9—9 of Fig. 7.

Openings are formed in the forward face of the bulkhead 20 to afford access to the handles 74 and 75 of the top and bottom locking bars in the hollow space already described, and the top and bottom edges of each are reinforced by angle members 84 welded to the plate 38 as shown in Figs. 7 and 8. Each of the openings is provided with a cover 85 similar to the covers 58 previously described in connection with the operation of the side locking bars 45. The covers 85 are provided with the identical latches and finger holes 63 and 64 employed on the covers 58, and each is stiffened by a diagonally extending angle member 86 welded to its inner surface. A vertical channel member 87 paralleling the channel member 69 is welded between the flanges of the side member 33, with one of its flanges defining one of the vertical edges of the openings, the opposite edge being defined by a forwardly extending corrugation at the adjacent edge of the corrugated plate 40, as shown in Fig. 9. The handles 74 and 75 extend through vertical slots in the webs of the channel members 69 and 87 so that they may be moved up or down to project or retract the locking bars 70, but it will be clear that the handle 74 must be moved upwardly to project the top bar 70 while the handle 75 must be shifted downwardly to project the bottom bar 70 to locking position. Welded to the channel member 87 above each handle slot is a support 88 extending toward the plate 40 over the handle. A member 89 is pivotally mounted on the upper bracket to swing transversely of the bulkhead and a similar pivotal member 90 is swingably carried by the lower bracket. Each member 89 and 90 is in the form of a plate with a slot 91 extending thereinto from its rear edge, the slot being sufficiently large to accommodate the associated handle 74 or 75 and extending downwardly and forwardly substantially on an arc struck with the pivot point of the pivotal member as its center. The upper pivotal member 89 is of suffiicent length to depend below the bottom of the handle slot in channel member 87, and has a flange 92 with an aperture therein. An angle plate 93 is welded to the member 87 to extend horizontally below the handle 74 a sufficient distance to underlie the flange 92, and has an aperture for registry with the flange aperture to receive a padlock or the like when it is desired to lock the member 89 in vertical position. Apertures 94 are also provided in the pivotal member 89 adjacent its reare edge above and below the slot 91. The lower pivotal member 90 is of a length to have its lower edge lie just above the handle 75 when the latter is in its lowermost position, as shown in Fig. 8, corresponding to the projected position of the bottom locking bar 70. On the inner face of the lower cover 85 is a projection provided by an angle plate having a vertical portion 95 extending rearwardly beyond the handle 75, and located at the level of the uppermost or retracted position of the handle. In Fig. 8, the top locking bar 70 is indicated as retracted, with the handle 74 in its lowermost position, while the bottom bar 70 is projected into locking position, the handle 75 also being in its lowest position. The lowermost positions of the handles are of course determined by the lower ends of the respective handle slots in the channel members 69 and 87. In the low or retracted position of upper handle 74, it is engaged by the rear edge of the pivotal member 89 below the slot 91, so that the lower portion of the forward edge of the pivotal member projects out of the opening in the face of the bulkhead and holds the upper cover 85 in an open position out of the plane of the bulkhead face, as will be clear from Fig. 8. When the handle 74 is moved upwardly to shift the top bar 70 into locking position, the pivotal member 89 swings rearwardly so that the handle is engaged in the slot 91, and is thus locked against retracting movement. A sealing member may be passed through the apertures 94 and a lock engaged through the apertures of the flange 92 and cooperating angle plate 93 as protection against pilfering. When the member 89 is swung into its vertical handle-securing position, it is disposed entirely within the bulkhead 20, and the cover 85 may be closed, lying substantially flush with the bulkhead face, and locked by engagement of the latch bolt 59 in the aperture of the angle member 84. The member 89 is held by the cover against swinging to release the handle from slot 91. To retract the top locking bar 70, the upper cover 85 is unlatched and swung open, any sealing or locking means employed on the pivotal member 89 released, and the member is swung forwardly to release the handle 74 for downward retracting movement to the position of Figs. 7 and 8. The operation of the lower pivotal member 90 is somewhat different from that of the upper member 89. In the projected position of the bottom bar 70, the handle 75 is held against upward or retracting movement by the lower edge of the member 90, which is entirely within the bulkhead and prevented from swinging sufficiently to clear the handle by the rear flange of the side member 33 and the lower cover 85, which is in its closed and latched position. To retract the bottom locking bar, the cover is opened, the pivotal member 90 swung forward through the opening to clear the handle, and the handle raised and engaged in the slot 91, the member 90 being returned to its vertical position. The lower pivotal member thus holds the handle and bottom bar 70 in upper retracted position. The lower cover 85 is held open in the retracted position of the locking bar by engagement of the rear edge of the projection portion 95 against the handle 75. To project the bottom bar 70 to locking position, the cover and pivotal member 90 are swung forwardly to allow downward movement of the handle and locking bar, after which movement the member 90 and the cover 85 may swing to their positions as shown in Figs. 7 and 8. It is to be noted that despite the operational difference between the upper and lower pivotal members, both covers are latched in closed position substantially flush with the bulkhead face when the locking bars are projected, and are held in open position out of the plane of the bulkhead face when the bars are retracted, to signal locked or unlocked condition of the locking bars 70 in the same way that the covers 58 indicate the condition of the side locking bars 45. It will also be apparent that as with the side locking bars, the top and bottom locking bars are positively held against accidental retraction from locked position. To permit application of a lever against the handles in the event the locking bars 70 should resist movement by the hand, fulcrum plates 96 with vertically spaced apertures therein to receive an end of the lever are welded to the edge portion of the plate 40 rearwardly of the handles 74 and 75.

The frame of the bulkhead is rendered very strong, although relatively light, by the use of channel members, particularly at the inner and bottom edges where additional channel members are employed to provide hollow box section elements, and at the intermediate frame member 36 which is formed into a hollow section by the plate 41. An angle member 97 is similarly arranged in the side frame member 33 at the outer edge of the bulkhead (Fig. 6) to strengthen the frame, one flange extending transversely of the bulkhead and the other lying against the rear flange of the member 33 and having its edge portion bent forwardly to abut against the end corrugation of the plate 40. The bulkhead has ample strength combined with sufficient resilience to sustain the impacts of lading without suffering appreciable damage or deformation, yet is light enough to be readily adjusted to any selected position without requiring any undue force for shifting along the track 21 or pivoting on the post 25. The weight of the bulkhead is nevertheless considerable, and necessarily imposes a corresponding stress on the post 25 and its pivotal connections therewith. To relieve the post and pivots of a portion of such stress, an auxiliary support 100 is provided at the inner end of the bulkhead adjacent the bottom, which is adapted to bear on the floor F or lower keeper 72 to transmit thereto a part of the weight of the bulkhead. The support 100, best illustrated in Figs. 13 to 15, comprises an elongated plate 101 disposable vertically to receive the weight of the bulkhead and having a gently peaked or obtusely angled upper edge 102 and an elongated centrally located slot 103. The plate 101 is mounted to pivot parallel to the inner edge of the bulkhead 20, defined by the web of side member 33, and the plate 83 alined therewith, by means of a pin 104. The transverse plate 83 has a reinforcing disk 105 welded on its outer face, and the pin is disposed extending through registering apertures in these plates and welded to plate 83 at one end. The other end of the pin projects beyond the edge of the bulkhead and through the slot 103 of the support plate 101, and has a washer 106 welded thereon to retain the plate 101 in place. An abutment 107 with an obtusely angled lower surface corresponding to the upper edge 102 of the support plate is welded to the edge of the bulkhead above the plate 101 to engage thereon when the plate is disposed in its vertical supporting position, as will be clear from Figs. 13 and 14. The abutment has a depending stop portion 108 at its rear end engageable by the rear edge of the support plate 101 so as to limit swinging of the plate in either direction. The plate is shown in an idle or non-supporting position in Fig. 15, with its rear edge uppermost and engaging near its bottom edge against the stop portion 108, so that the plate is held substantially horizontal and clear of the floor. The support plate 101 may be swung clockwise from the position of Fig. 15 to engage its lower forward corner on the floor or keeper and its upper rear corner under the forward end of abutment 107 as indicated in Fig. 14, so that while the bulkhead is swung rearwardly toward its transverse position the support plate will cam the bulkhead upwardly by relative movement of its upper edge 102 against the abutment and then downwardly to seat the abutment on the edge 102 as the plate is rotated by the action of the pin 104 and comes to its vertical supporting position. The vertical movement of the bulkhead is permitted by the slot 103 in the plate. It is to be noted that the height of the plate in its vertical position and the location of the abutment on the bulkhead are such that in its plate-supported position the bulkhead is raised slightly, a distance of the order of a fraction of an inch, above the position is occupies when the plate is in idle position, as will appear from a comparison of Figs. 14 and 15. A portion of the bulkhead load on the post 25 and the bulkhead pivots is thus transferred to the support 100. Instead of bringing the bulkhead into supported position on the plate 101 in the manner just described, it may be desirable to swing the bulkhead to its transverse position with the plate idle, then by means of a pinch-bar or the like applied under the lower edge of the bulkhead raise it sufficiently to allow the plate 101 to be swung substantially freely to its vertical position, and then lower the bulkhead to bring the abutment 107 into engagement on the upper edge 102 of the plate 101. Clockwise rotation of the support plate is limited by engagement of the upper edge against the lower surface of the abutment, or at most against the stop portion 108, while counterclockwise turning beyond the position shown in Fig. 15 is prevented by the stop portion 108. The plate 101 may possibly assume an idle position with the lower forward corner resting on the floor or other supporting surface, although its weight distribution is such that when free it normally swings against the stop portion 108, but in either idle position the plate projects forwardly of the bulkhead to indicate that it is not in supporting position, and does not interfere with the lading by extending rearwardly of the bulkhead. The bulkhead may be released from its position supported by the plate 101 merely by swinging it forwardly, when the engagement of the abutment 107 on the edge 102 and of the stop portion 108 against the rear edge of the plate will cause the plate to pivot counterclockwise relative to the bulkhead so that the bulkhead will ride off the plate, there being camming movement of the bulkhead first upwardly and then down by the engagement of the plate and abutment. The auixiliary support 100 ordinarily is employed only when the bulkhead is in its transverse lading-retaining position, but may if desired be employed also when the bulkhead is in a stowed or idle position.

During loading and unloading, the bulkhead 20 is swung forwardly from its transverse position to extend along the side wall of the car, and to prevent its accidental dislogement and movement from such out-of-the-way position, a hook 109 is provided on its inner or free edge which may be engaged with the upper side keeper member 47, it being noted from Fig. 1 that the hook is secured to the bulkhead at substantially the level of that keeper member. A seal hasp 110 is also secured to the inner edge of the bulkhead so that a seal may be passed through the hasps of a pair of the bulkheads alined transversely of the car, the hasps of paired bulkheads being at slightly different levels as shown in Fig. 1 so as not to engage each other and so interfere with positioning of the bulkheads.

Figure 3:
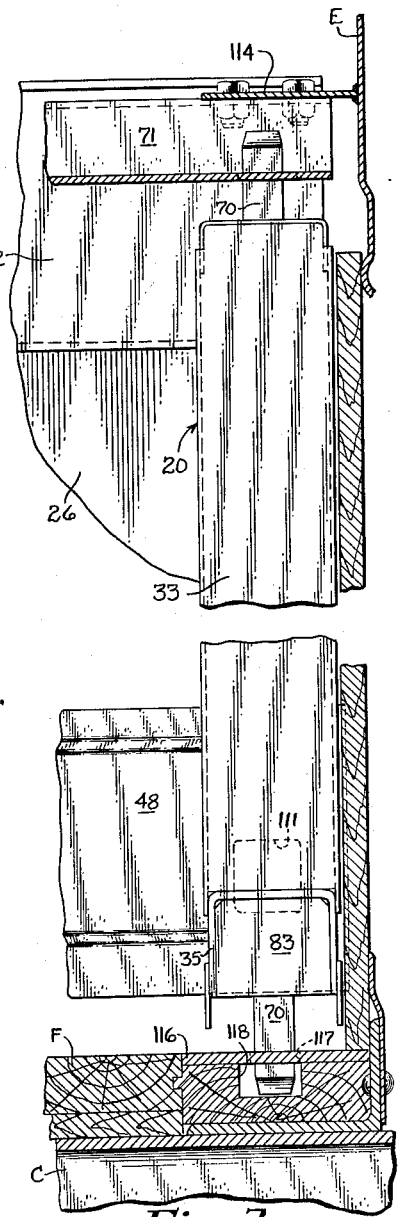
Fig. 3 is a broken end elevation of the bulkhead on an enlarged scale with the auxiliary support omitted for clearances.

The upper and lower side keeper members 47 and 48 and the top and bottom keeper members 71 and 72 are elongated metal plates of dished or hat section with a series of longitudinally spaced apertures 111 therein. The side keeper members, as evident from Figs. 1 to 4, are mounted horizontally as parts of the side lining L, with their inner surfaces flush therewith, and extend from the door post to the corner post at the end of the car, being welded or otherwise secured to the side posts. The upper keeper member 47 is disposed at the level of the upper side locking bar 45 of the bulkhead, while the lower keeper member 48 forms the bottom of the lining L at the level of the lower bar 45 and is engaged by the roller 31. The apertures 111 of the side keeper members receive the locking bars when the latter are projected and are of a width only slightly greater than the width of the bars 45, so as to hold them against transverse movement as far as possible, but are considerably elongated, transversely of the keeper members or vertically of the side wall, to allow for variations in the level of the bulkhead 20 relative to the wall. The apertures 111 are provided in the forward portions of the keeper members, that is from the door post to the vicinity of the bolster at one end of the car, and a single one of the apertures is provided at the end of each keeper member adjacent the car end wall, as shown in Fig. 3. It will be noted that the side keeper members are formed of such section as to be self-cleaning, that is, the edge portions are at such an angle to the web that any material entering through the apertures 111 will fall behind the lining L to the grain strip so that it may readily be romeved by means of the usual gap between the lining and floor. The top keeper 71 and bottom keeper 72 are similar to the side keeper members, but are wider and may be somewhat deeper, and are provided with two rows of apertures instead of one. The top keeper member 71 extends horizontally from the vicinity of the door to the end of the car, below the roof R, midway between the car sides. Its apertures 112 are similar to the apertures 111 of the side keeper members, having a greater dimension transversely of the plate than longitudinally thereof, to receive the top locking bars 70 of the bulkheads with a minimum of bulkhead play lengthwise of the car while allowing for variations in car widths and consequent differences in the location of the inner bulkhead ends. Each of the two rows of apertures 112 extends along one side of the keeper member 71 above the top locking bar 70 of one of the pair of bulkheads 20 disposed between the end and center of the car. As with the side keeper members, the apertures are formed in the forward portion of the top keeper member, from adjacent the center of the car to the area above the bolster, and a single pair of apertures 112 is provided adjacent the end wall. The keeper member 71 is supported from the roof R of the car by bracket plates 113. These plates have their upper ends extending between the upturned flanges of adjacent roof sheets or panels under the seam caps G and secured by the usual rivets or the like, and their lower ends are flanged and bolted to the flanges of the keeper member, as shown in Figs. 1, 10, and 11. The rear end of the top keeper member is secured to the end wall E of the car by a horizontal plate 114 welded to the end wall and bolted to the keeper member flanges (Fig. 3). The keeper member 71 is self-cleaning by reason of the apertures 112 in its lowermost portion. The bottom keeper member 72 is similar to the top keeper member, but inverted relative thereto, and is disposed with its flanges bearing on the center sill C and preferably projecting laterally thereof. Like the other keeper members, the bottom keeper member extends from substantially the plane of the door post, but terminates short of the end of the car, approximately at the bolster, and its two rows of apertures 115 extend along its entire length. These apertures 115 are substantially identical in size and arrangement with the apertures 112 of the top keeper member. The apertured web or upper face of the keeper member is disposed flush with the floor F, the boards of which of course do not extend entirely across the car at the portions containing the bottom keeper members, but from each side sill S to the adjacent side of the keeper member 72. These boards extend over the horizontal flanges of the side sills and keeper member and are secured by the usual floor clips or the like, suitable filler strips being employed if necessary to obtain the flush fit of the floor parts. At the opposite ends of the bottom keeper member, the floor F may be provided with suitable clean-out openings closed by removable access plates (not shown) to permit clearing out of any material which may find its way under the keeper member, and the center sill may be provided with suitable holes (not shown) for drainage of moisture which may accumulate in the keeper member by condensation or otherwise, and to aid in clearing out the space beneath the keeper member 72. At each end of the car, over the end sill, an end keeper plate 116 is secured flush with the floor and alined with the bottom keeper member, in which are formed a pair of apertures 117 alined with each other transversely of the car and plate and alined with the rows of apertures 115 of the bottom keeper member longitudinally of the car. The apertures 117 are somewhat wider than the apertures 115 and open into a recess 118 formed in the underlying floor board so that they may receive the bottom locking bars 70 of the bulkheads. The keeper members and end keeper plates are arranged so that corresponding apertures thereof are in substantially the same vertical planes transversely of the car, so that the locking bars 45 and 70 may be engaged in the apertures to hold the bulkheads at a selected position or positions extending transversely of the car. The bulkheads of each pair may be employed in either alined or staggered relation, depending upon the nature and requirements of the lading, each bulkhead being movable and lockable independently of the others. The various positions to which the bulkheads may be moved for retaining lading are determined by the spacing of the keeper member apertures longitudinally of the car, which preferably is such as to permit close adjustments of the bulkheads relative to the lading to be restrained thereby. The bulkheads are of course shifted to the desired position substantially against the lading by movement of the carriages 22 on the track 21 and secured by projection of the locking bars into the appropriate apertures of the keepers. When so locked, lading impacts against the bulkhead are transmitted through the bulkhead side and bottom members and the side and bottom locking bars directly to the car structure, and through the diagonal frame member 37 to the upper part of the inner side frame member the top locking bar and thereby to the top keeper and car structure. Lading impact is concentrated against the bulkhead at approximately one-third of its height above the floor or in other words about midway of the height of the corrugated plate 40. During loading and unloading, the bulkheads are swung out of the way against the side walls. If the bulkheads are not to be employed for a particular shipment, they may be moved to the end of the car in transverse position and secured by engagement of the locking bars in the end apertures of the several keepers and end keeper plate. In this position, the bulkheads are permitted sufficient movement to engage against the end lining without engagement of the locking bars against the end edges of the apertures. This provides for reinforcement of the end wall and better distribution of the load thereagainst, without danger of damage to the locking bars.

What is claimed is:

1. A bulkhead adapted to be mounted for movement longitudinally in a vehicle to any one of selected positions relative to keeper means comprising a series of perforations longitudinally aligned in a lading space surface of the vehicle, said bulkhead comprising frame members defining the peripheral edges of the bulkhead, one of which members has an opening therethrough, means for locking said bulkhead in said selected position comprising a locking bar slidably mounted in the bulkhead and projectible outwardly of the edges of the bulkhead through the opening in said frame member for engagement with selected openings of said keeper means, said bulkhead further comprising a pair of spaced apart faces secured to opposite surfaces of said frame members one of which faces has an opening affording access to the space between the faces, a closure for the opening pivotally mounted on said one face adjacent to the opening, means connected with the locking bar for operating the locking bar and disposed in said space and accessible through said opening, and catch means mounted on said bulkhead and engageable between said operating means and said closure when the locking bar is in retracted position to keep said closure out of the plane of said one face and engaging said operating means to prevent movement of said locking bar from projected position when said closure is in the plane of said one face.

2. A bulkhead adapted to be mounted for movement longitudinally in a vehicle to any one of selected positions relative to keeper means comprising a series of perforations longitudinally aligned in each of two right-angularly related longitudinally extending surfaces of a lading space of the vehicle, said bulkhead being of generally rectangular shape and comprising frame members defining the peripheral edges of the bulkhead, two of said members being right-angularly related and having openings therethrough, means for locking said bulkhead in said selected position comprising a pair of locking bars slidably mounted in the bulkhead and projectible outwardly of two right-angularly related edges of the bulkhead through the openings in said two frame members for engagement with selected openings of said keeper means, said bulkhead further comprising a pair of spaced apart faces secured to opposite surfaces of said frame members one of which faces is apertured to provide a pair of openings affording access to the space between the faces, closures for the openings pivotally mounted on said apertured face adjacent to the openings, handles connected with the locking bars for operating the locking bars and disposed in said space and each accessible through one of said openings, and a pair of catch means mounted on said bulkhead each engageable between one of said handles and the closure for the adjacent opening when the locking bar connected to said handle is in retracted position to keep said closure out of the plane of said apertured face and engaging said handle to prevent movement of said locking bar from projected position when said closure is in the plane of said apertured face.

3. A bulkhead as claimed in claim 1, in which the catch means comprises an element affixed to the closure and projecting therefrom into the space between the bulkhead faces.

4. A bulkhead as claimed in claim 1, in which a support member is mounted on the bulkhead in the space between the bulkhead faces and the catch means comprises a swinging member pivoted on said support for swinging movement between the operating means and the closure.

5. A bulkhead as claimed in claim 1, in which a support member is mounted on the bulkhead in the space between the bulkhead faces and the catch means comprises a swinging member pivoted on said support for swinging movement between the operating means and the closure and includes a slot adapted to receive and hold the operating means in a position corresponding to one position of the locking bar.

6. A bulkhead as claimed in claim 1, in which a support member is mounted on the bulkhead in the space between the bulkhead faces and the catch means comprises a swinging member pivoted on said support for swinging movement between the operating means and the closure, being swingable outwardly to engage between the operating means and the closure to hold the closure extended out of the plane of the bulkhead face on which it is mounted when the locking bar is in retracted position and being provided with a slot adapted to receive the operating means when the locking bar is in projected position thereby permitting the swinging member to swing inwardly so that the closure may be closed into the plane of the bulkhead face on which it is mounted, with the engagement of the operating means in said slot holding the locking bar in projected position.

7. A bulkhead as claimed in claim 1, in which a support member is mounted on the bulkhead in the space between the bulkhead faces and the catch means includes a projection affixed to the closure and projecting from the closure into the space between the bulkhead faces and a swinging member pivoted on said support for swinging movement in and out of said space, said projection being engageable between the operating means and the closure when the locking bar is in retracted position to keep the closure out of the plane of the bulkhead face on which it is mounted, and said swinging member having a surface engageable by the operating member when the locking bar is in projected position preventing movement of the locking bar to retracted position and having a slot adapted to receive the operating means and hold the locking bar in retracted position after the closure has been opened and the swinging member has been swung first outwardly and then inwardly.

References Cited in the file of this patent

UNITED STATES PATENTS

| | | |
|---|---|---|
| 1,336,892 | Crane | Apr. 13, 1920 |
| 1,483,312 | Oesterling | Feb. 12, 1924 |
| 1,567,932 | Eschenbacker | Dec. 29, 1925 |
| 2,071,802 | Sweeley et al. | Feb. 23, 1937 |
| 2,073,149 | Geyer | Mar. 9, 1937 |
| 2,220,436 | Ziegler | Nov. 5, 1940 |
| 2,336,439 | Giddings | Dec. 7, 1943 |
| 2,517,823 | Angell | Aug. 8, 1950 |
| 2,614,295 | Een | Oct. 21, 1952 |